(12) United States Patent
Göetz et al.

(10) Patent No.: US 8,997,952 B2
(45) Date of Patent: Apr. 7, 2015

(54) MOTOR VEHICLE SHOCK ABSORBER

(75) Inventors: Ole Göetz, Braunschweig (DE); Wolfgang Hamers, Jülich (DE); Klaus Schmidt, Odenthal (DE); Dmitrij Smeljanskij, Leverkusen (DE); Freddy Woenarta, Braunschweig (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 13/383,456

(22) PCT Filed: Aug. 23, 2010

(86) PCT No.: PCT/EP2010/005152
§ 371 (c)(1),
(2), (4) Date: Jan. 11, 2012

(87) PCT Pub. No.: WO2011/023351
PCT Pub. Date: Mar. 3, 2011

(65) Prior Publication Data
US 2012/0145496 A1    Jun. 14, 2012

(30) Foreign Application Priority Data
Aug. 25, 2009  (DE) .................. 10 2009 038 818

(51) Int. Cl.
*F16F 9/50*     (2006.01)
*F16F 9/46*     (2006.01)

(52) U.S. Cl.
CPC ..................................... *F16F 9/464* (2013.01)

(58) Field of Classification Search
USPC ......... 188/319, 299, 322.15, 285, 282.4, 289, 188/281, 282.7, 282.8, 319.1, 282.1
See application file for complete search history.

(56) References Cited

U.S. PATENT DOCUMENTS

| | | | | |
|---|---|---|---|---|
| 4,723,640 | A * | 2/1988 | Beck ........................ | 188/282.3 |
| 5,392,883 | A * | 2/1995 | Huang et al. ............. | 188/282.3 |
| 5,501,307 | A | 3/1996 | Lars | |
| 5,810,127 | A | 9/1998 | Schmidt | |
| 6,202,805 | B1 * | 3/2001 | Okada et al. ............. | 188/266.2 |
| 6,460,663 | B1 | 10/2002 | Huang | |
| 2004/0188200 | A1 * | 9/2004 | Katayama et al. ....... | 188/322.15 |

FOREIGN PATENT DOCUMENTS

DE    4008326 B    7/1991

OTHER PUBLICATIONS

International Search Report.
Registerauszug zum Aktenzeichen 10 2009 038 818.4.

* cited by examiner

*Primary Examiner* — Melanie Torres Williams
(74) *Attorney, Agent, or Firm* — Andrew Wilford

(57) ABSTRACT

A motor-vehicle shock absorber has a tube at least partially filled with damping liquid and extending, a piston rod axially shiftable inside the damper tube, and a piston connected to the piston rod and subdividing the damper tube into a piston rod-side working chamber and an opposite working chamber. An on-off control valve is axially movable inside the piston between a closed and an open position. A first soft-characteristic damping valve inside the piston through which the damping liquid may flow in both flow directions is connectable to a flow path of the damping liquid from one into the other working chamber through the control valve. A second hard-characteristic damping valve through which the damping liquid may flow in both flow directions is also provided in the piston.

12 Claims, 6 Drawing Sheets

MOTOR VEHICLE SHOCK ABSORBER

CROSS REFERENCE TO RELATED APPLICATIONS

This application is the US-national stage of PCT application PCT/EP2010/005152 filed 23 Aug. 2010 and claiming the priority of German patent application 102009038818.4 itself filed 25 Aug. 2009.

FIELD OF THE INVENTION

This invention relates to a shock absorber for a wheel suspension of a motor vehicle. The shock absorber according to the invention comprises among other things a control valve, allowing for the shock absorber to be switched back and forth between a soft damping characteristic and a hard damping characteristic. In particular, the invention relates to such a shock absorber that can be switched back and forth between two damping levels of different hardness and that can be used in small diameter damper tubes.

Furthermore, the invention relates to a valve arrangement for integration into the interior of a damper tube of a shock absorber in order to produce a shock absorber which can be switched back and forth between a soft damping characteristic and a hard damping characteristic.

BACKGROUND OF THE INVENTION

Shock absorbers for the wheel suspension of motor vehicles, in which the damping force may be varied, have already been available for a long time. For this purpose, various approaches are known from prior art. On the one hand, prior art suggests shock absorbers fitted with continuously variable valves and which allow for the damping force of the shock absorber to be varied continuously. The implementation of such continuously adjustable valves implies some technical effort so that such shock absorbers are comparatively expensive to manufacture.

Besides shock absorbers with continuously adjustable damping force, also known from prior art are shock absorbers wherein a defined arrangement of passive damping valves in conjunction with a control valve allows for setting different damping characteristics. In particular, it is possible to set different damping characteristics for the rebound stage and the compression stage. An example of this kind of motor vehicle shock absorbers with variable damping force is described in document DE 38 03 888 C2.

From document DE 35 18 327 (U.S. Pat. No. 4,723,640), a hydraulic adjustable vibration absorber is known. In the shock absorber known from this document, a damping piston is provided that is provided on a pin of a housing screwed onto the piston rod. In DE 35 18 327, this housing is designated by the term "intermediate sleeve".

The damping piston has damping valves cooperating with flow passages provided inside the body of the damping piston. Such damping valves are configured so as to have a hard damping characteristic, i.e. so as to produce high damping forces when damping liquid flows through the flow passages. A bypass is provided hydraulically in parallel to the damping piston. Inside the bypass, a bypass valve is provided. The latter has a soft damping characteristic, i.e. when damping liquid flows through the bypass valve, only a relatively low damping force is generated in comparison with the damping piston.

The bypass valve is provided on a flow path formed through a transverse bore in the housing, i.e. in the envelope of the "intermediate sleeve", and a longitudinal bore in the pin supporting the damping piston. Inside the housing, a control valve is provided. The control valve comprises a coil and a valve body made as an armature. When the coil is not energized then the valve body is seated on a valve face, not identified by a reference number in DE 35 18 327, of a component having an H-shaped cross-section, also not designated more in detail. In this state, the control valve is closed ("closed when currentless"). When the coil is energized, the valve body lifts from the surface against the force of the return spring. The damping medium may then flow from the lower working chamber of the shock absorber into the upper working chamber or in the opposite direction through the bypass. Here, the damping liquid flows through the bypass valve having the soft damping characteristic, so that the shock absorber only generates comparatively low damping forces.

In the closed state of the control valve, however, the bypass is closed so that there is no flow through the bypass valve. The damping liquid then flows through the flow passages in the damping piston and cooperates with the damping valves provided on the damping piston and that have the hard damping characteristic. Due to this arrangement, the safety-relevant demand of a so-called "fail-safe function" is satisfied. "Fail-safe" means that in case of sudden failure of the electrical power supply of the shock absorber, the damper must generate a hard damping characteristic in order to warrant safe driving stability even at high speeds and e.g. when cornering.

In the design known from DE 35 18 327, the disadvantage is that the valve arrangement disclosed therein is only suitable in a limited way for an implementation in shock absorbers having a small damper tube diameter. The damping valve having the soft damping characteristic ensures comfortable damping, providing the passengers of the vehicle with a pleasant driving experience. Therefore, the person skilled in the art also designates this valve as a "comfort valve". Due to the soft plating of the comfort valve, less resistance is opposed to the damping liquid, and thus smaller damping forces are generated. In order to be able to provide a sufficiently large flow section for the soft damping characteristic, even at higher damper speeds, a diameter as large as possible for the comfort valve and the valve disks thereof is targeted. However, in the shock absorbers described in DE 35 18 327 A1, for design reasons, the comfort valve only has a relatively small diameter. Consequently, at least when the damper tube only has a small diameter, it is not possible to design this comfort valve to be large enough to offer sufficient driving comfort and spread between the hard and soft damping characteristics, even at higher damper speeds. Also, the durability of smaller diameter valve disks is significantly lower than for larger diameter valve disks. Moreover, the valve arrangement described in DE 35 18 327 has a large overall axial length due to the cross-section of the H-shaped element on which the armature/valve body of the control valve is sealingly resting.

Another disadvantage of the subject matter of DE 35 18 327 is that, as seen in the axial direction, the damping piston must have a minimum overall height if the shock absorber is to be used in a McPherson strut unit. Indeed, in such strut units, the steering movements of the vehicle are introduced via the piston rod of the shock absorber so that the corresponding transverse forces are transmitted via the damping piston to the damper tube. This can no longer be ensured if the damping piston falls short of the minimum overall height. Therefore, in DE 35 18 327 A1, the possibilities for reducing the overall axial height of the damping piston used for the hard damping characteristic are quite limited.

In DE 40 08 326, a hydraulic, controllable vibration absorber is described in which at least three different damping force levels can be set by an electromagnetically activated valve. A flow passage is controlled by the electromagnetic valve. In order to generate three different damping force characteristic curves, the valve body can be moved between two end positions, wherein the valve body is supported by at least two springs and can be set between the two end positions thereof in at least one intermediate position via a stop and a stop face. In the respective position, the valve body switches a corresponding bypass so that depending on the position of the valve body, a hard damping characteristic, a soft damping characteristic, and an intermediate average damping characteristic is set. Both springs are opposed to the magnetic force so that in the currentless state of the solenoid, both springs move the valve body into the normal position thereof. When the solenoid has been energized for the first time, the valve body is brought to a stop against the first spring, so that in this position, a bypass is switched. In a consecutive larger energization of the solenoid, the second spring is biased so that the valve body can be brought into the end position thereof, with a second bypass being released in this end position.

In the solution described in DE 40 08 326 C1, it is necessary to differentiate energization of the solenoid so that the valve body can be switched to at least three positions including a starting position. Consequently, it is either necessary to control current intensity when energizing the solenoid, or else—as claimed in dependent claim 8 of DE 40 08 326 C1—the solenoid must have at least two different magnetizing coils. Both of the above-mentioned options are in contradiction with a cost-effective shock absorber design.

Furthermore, the constructional configuration of the control valve according to DE 40 08 326 C1 is elaborate and cost-intensive due to the required springs for supporting the valve body and due to the required stop and stop face.

Moreover, in the solution disclosed in DE 40 08 326 C1, the hard damping characteristic is not provided simply by a single damping valve having a hard damping characteristic, but a sporty hard setting of the vibration damper is achieved by an elaborate hydraulic series connection of the valve disk sets called "spring leaves 16, 17", cf. FIGS. 1 and 2 as well as col. 3, lines 11-14.

Finally, with reference to the solution disclosed in DE 40 08 326 C1, it is disadvantageous that the rise, i.e. the gradient of the damping characteristic curves in the force/speed diagram is fixedly set in the range of low piston rod speeds. Consequently, in the range of low piston rod speeds, this solution does not meet the demand of flexible adaptability of the gradients of the damping characteristic curves to different customer demands.

OBJECT OF THE INVENTION

The invention is based on the object of providing a shock absorber for a wheel suspension of a motor vehicle having a damping force which can be switched back and forth between two damping force levels and which generates a sufficiently soft damping characteristic even with small damper tube diameters at all piston rod speeds, and in which the damping valve arrangement takes up little overall axial length.

In particular, a cost-effective shock absorber for the wheel suspension of a motor vehicle having a small damper tube diameter is to be provided that can be switched back and forth in spite of the small damper tube diameter thereof between a hard and a soft damping characteristic.

SUMMARY OF THE INVENTION

According to the invention, this problem is solved by a shock absorber in which the second damping valve is inside the housing, and the housing forms the element that subdivides the interior of the damper tube into a piston rod-side working chamber and a working chamber remote from the piston rod.

Furthermore, the invention attains the object of providing a solution allowing in particular with shock absorbers for a wheel suspension of a motor vehicle having small damper tube diameters to switch the piston rod back and forth between two damping force levels for each moving direction. This problem is solved by a valve arrangement in which the second damping valve is arranged in the interior of the housing, and the housing forms an element that subdivides an interior of a damper tube of the shock absorber into a piston rod-side working chamber and a working chamber remote from the piston rod.

The valve arrangement according to the invention is suitable both for use in single tube dampers (single chamber active principle) and in double tube dampers (double chamber active principle).

According to the invention, not only the first damping valve having the soft damping characteristic, but also the second damping valve having the hard damping characteristic, is provided inside the housing, and the housing forms the element by which the interior of the damper tube is divided into a piston rod-side working chamber and a working chamber remote from the piston rod. Thereby, a conventional damping piston dividing the damper tube into a piston rod-side working chamber and a working chamber remote from the piston rod that is frequently also called "working piston" and that is used in conventional shock absorbers, can be omitted. In the present invention, the damping function of the conventional damping piston providing a hard damping characteristic is moved into the housing, so to speak, by virtue of the arrangement of the second damping valve. Thereby, the designer can minimize the second damping valve with respect to the overall axial height thereof, because it no longer has to transmit transverse forces. In the design according to the invention, transverse forces are transmitted by the housing adjacent to the damper tube. Especially for use in McPherson strut units that are very frequently used in motor vehicles, the inventive solution is thus well suited.

In the design according to the invention, the designer can maximize the housing with respect to the inner and outer diameter thereof, so that, in particular in shock absorbers having a small damper tube diameter, a maximum diameter is available for housing the damping valve having the soft damping characteristic. Thereby, even in shock absorbers having a small damper tube diameter of e.g. 32 mm, a sufficient spread between hard and soft damping characteristics and satisfactory driving comfort can be achieved at all piston rod speeds. Moreover, the durability of the valve disks is significantly improved.

The first and second damping valves are preferably embodied as passive pressure relief valves. It is particularly preferred for said valves to be embodied as spring washer valves.

According to the invention, the first and second damping valves are hydraulically interconnected in parallel.

According to the invention, the valve by which the first damping valve having the soft damping characteristic can be switched from one into the other working chamber on the flow path of the damping liquid, is embodied as a control valve that can be switched back and forth between a closed and an open position. Advantageously, the control valve can be embodied as an electromagnetic or piezoelectric control valve.

According to a preferred embodiment of the invention, between the first and second damping valves, an element having at least one check valve is provided. The element may have a check valve through which the damping liquid may only flow when the piston rod moves in one direction. Thus, the flow may pass through the check valve only when the piston rod moves in the direction of rebound, or the flow may pass through only when the piston rod moves in the direction of compression. As a result, it is only when the piston rod effectively moves in this moving direction that an additional bypass passage is available for the damping liquid. This additional bypass passage directs a partial flow of the damping liquid around the damping valves having the soft and the hard damping characteristics. As a result, in this moving direction of the piston rod, a damping force gradient having a smaller rise, i.e. a smaller gradient in the range of low piston rod speeds, than the damping force gradient resulting for the other moving direction appears in the force/speed diagram. Indeed, when the piston rod moves in the other direction, the check valve of the element closes the additional bypass passage so that all of the damping liquid must flow through the damping valves having the soft and hard damping characteristics.

Another effect of the additional bypass passage provided by the check valve of the element is that in the moving direction of the piston rod in which the flow may pass through the check valve, a damping force gradient appears in the force/speed diagram which has a lower rise, i.e. a lower gradient, in the range of low piston rod speeds than the damping force gradient which would result for the same moving direction if the check valve on the element were not there.

Thus, due to the element with the check valve, depending on the moving direction of the piston rod, i.e. separately for the rebound stage and the compression stage, specifically a desired slope of the damping force characteristic curve can be achieved in the range of low piston rod speeds. Indeed, in one piston rod moving direction, an additional bypass passage is available and effective, while it is not effective in the other piston rod moving direction because the flow cannot pass through it due to the check valve being closed.

Also, in the range of high piston rod speeds, the element with the check valve causes a different damping force gradient than what would be available if the element did not have a check valve. This will be explained more in detail below in the description of the practical sample embodiment.

According to another embodiment of the invention, the element provided between the first and second damping valves has two check valves, wherein the damping liquid may flow through one of them when the piston rod moves in one direction, and through the other one when the piston rod moves in the other direction, wherein the check valves cooperate with bypass passages having different flow sections. In this embodiment, the gradients of the damping force characteristic curves in the compression stage and in the rebound stage are specifically biased independently from each other by the dimensioning of the bypass passages in the element, so that the damping characteristic of the damper can be adapted very flexibly to customer demands.

According to one embodiment of the present invention, the control valve is embodied as an electromagnetic or piezoelectric control valve. It activates a valve body that in the closed state of the control valve is sealingly seated on a valve face. If the control valve is embodied e.g. as an electromagnetic control valve with a coil and a magnet core, then the valve body preferably is the movable armature of the control valve. Advantageously, the first damping valve having the soft damping characteristic has a peripheral edge forming a valve face for the valve body of the control valve. Thus, no separate component is required to provide a valve face for the valve body on which the latter may rest sealingly. Rather, the valve face is integrated into the damping valve having the soft damping characteristic. Again, this will also reduce or minimize the required axial space for the valve arrangement. For instance, in comparison with the solution known from DE 35 18 327 A1, in which a component having an H-shaped cross-section forms the valve face, considerable savings in axial space are achieved thereby.

BRIEF DESCRIPTION OF THE DRAWING

Hereafter, the invention will be explained more in detail with reference to a drawing showing an embodiment. In particular.

SPECIFIC DESCRIPTION OF THE INVENTION

Figure 1:
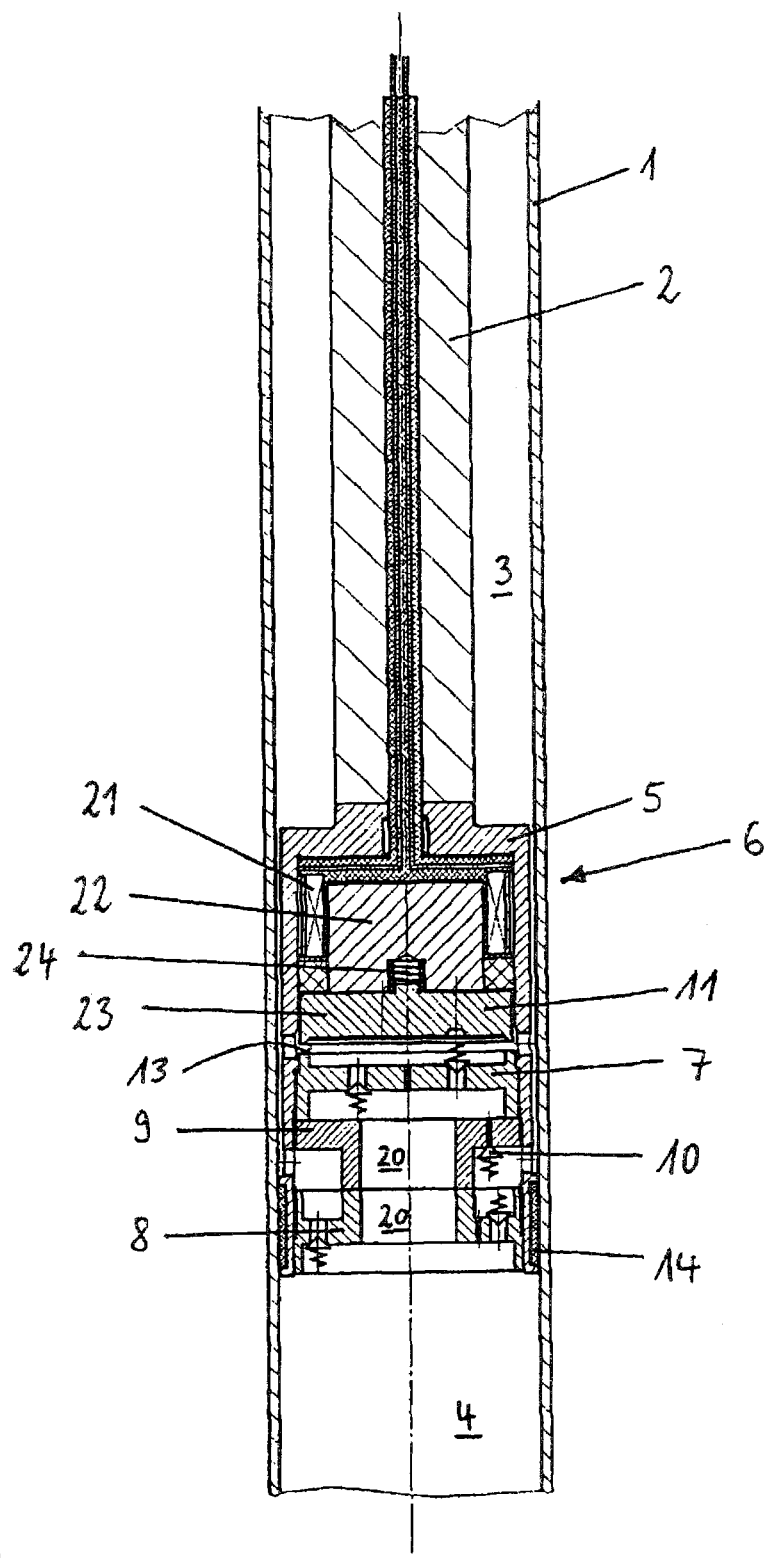
FIG. 1 shows a shock absorber according to the invention with the valve arrangement according to the invention in axial section.

FIG. 1 shows a fragment of a shock absorber according to the invention in axial section. The housing 5 is mounted on the piston rod 2 of the shock absorber. At the periphery thereof, the housing 5 has a so-called piston ring 14 sealingly cooperating with the inner wall of the damper tube 1. The piston ring 14 provided on the housing 5 divides the interior of the damper tube 1 into a piston rod-side working chamber 3 and working chamber 4 remote from the piston rod.

Inside the housing 5, a first damping valve 7 and a second damping valve 8 are provided. The first damping valve 7 has a soft damping characteristic, while the second damping valve 8 has a hard damping characteristic. The end of the housing 5 facing away from the piston rod 2 is open. Between the second damping valve 8 and the first damping valve 7 is an element 9. The second damping valve 8 and the element 9 together form a center passage 20. The element 9 has a check valve 10. In the illustrated embodiment, the check valve 10 is exclusively effective in the compression stage of the shock absorber. This implies that the check valve only opens when the piston rod 2 moves in the direction of compression (i.e. in FIG. 1 downward). When the piston rod 2 moves in the direction of rebound (i.e. in FIG. 1 upward), the check valve 10 remains closed.

Similarly, within the scope of the present invention, it would be possible for the check valve 10 to be embodied as a check valve exclusively effective in the rebound stage. However, in this specific sample embodiment, a check valve through which flow may take place exclusively in the compression stage is assumed as this is the case of application most frequently encountered. As already mentioned above, it is also possible to provide two check valves 10 on the element 9, with the flow through one of them in the direction of rebound and through the other in the direction of compression. Each check valve cooperates with a respective bypass passage 35. Appropriately, both bypass passages 35 have different dimensions in order to achieve a different influence of the damping characteristic curves in the rebound stage and the compression stage.

Furthermore, the valve arrangement inside the housing 5 comprises a control valve 6. In the illustrated embodiment, the control valve 6 is an electromagnetic control valve. It comprises a coil 21, a magnet core 22, and an armature 23. In the illustrated embodiment, the armature 23 is formed by the valve body 11. A helical compression spring 24 is provided between the magnet core 22 and the valve body 11. The helical compression spring 24 acts as a return spring, against the compression force of which the valve body 11 can be lifted by the magnetic force of the solenoid. When the electromagnetic control valve 6 is not energized, the helical compression spring 24 pushes the valve body 11 into the closed position so that it is sealingly seated on the valve face 13. This way, the so-called fail-safe function is ensured, i.e. in case of a sudden power outage, the control valve will close so that the first damping valve 7 having the soft damping characteristic does not receive any damping liquid flow, and only the second damping valve 8 having the hard damping characteristic affects the damping characteristic.

The operating mode of the valve arrangement according to the invention will be described more in detail hereafter with reference to first, second, and third selected operating states.

Figure 2:
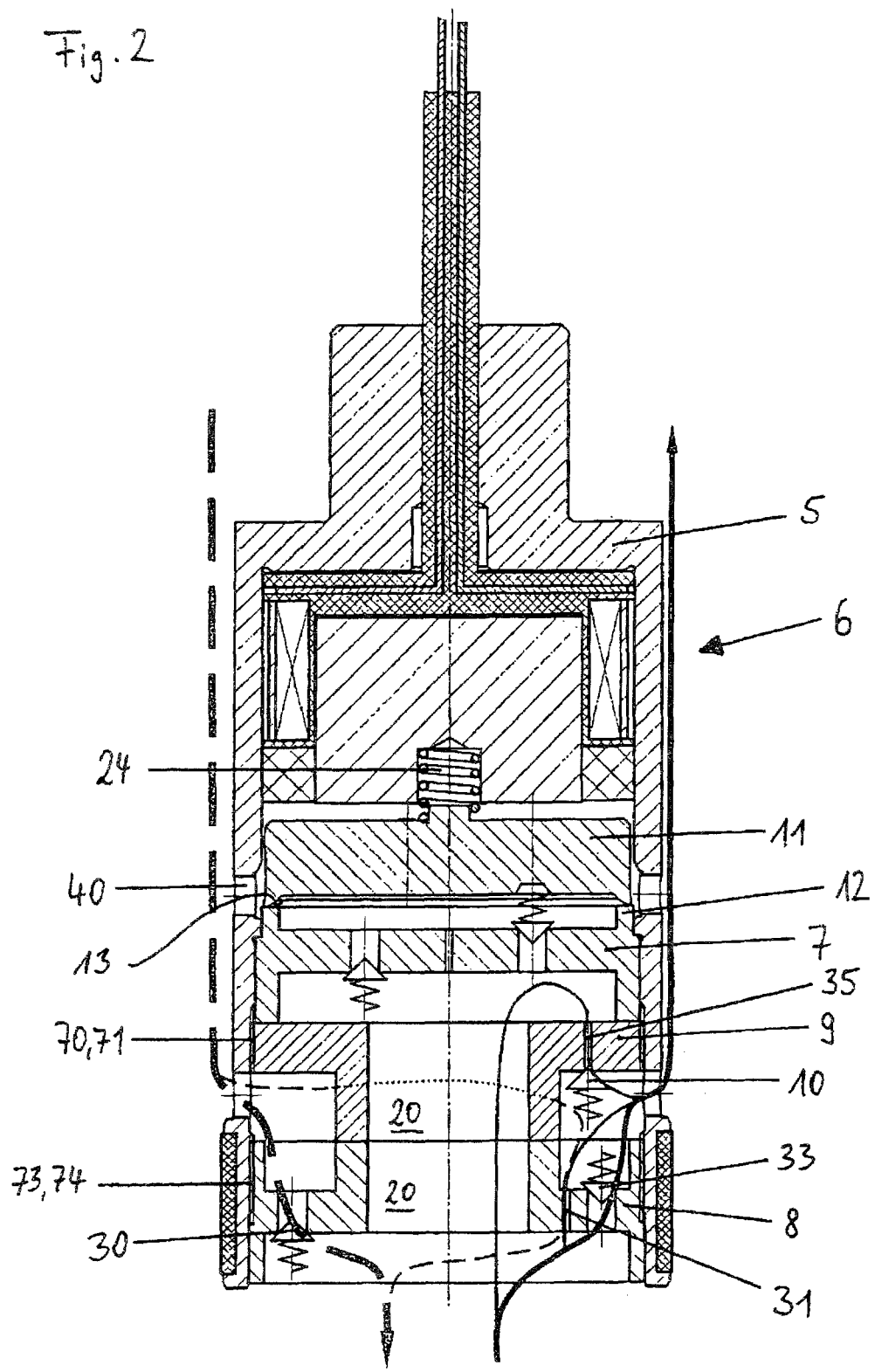
FIG. 2 shows the inventive valve arrangement according to FIG. 1 in a first operating state.

FIG. 2 represents a first operating state of the valve arrangement according to the invention. In order to achieve greater clarity and better comprehension, the valve arrangement according to the invention is shown in large scale, and the piston rod as well as the damper tube of the shock absorber have been omitted.

In the operating state represented in FIG. 2, the control valve 6 is closed. The helical compression spring 24 has pushed the valve body 11 onto the valve face 13 so that the valve body 11 is sealingly seated on the valve face 13. In this position of the valve body 11, the first damping valve 7 having the soft damping characteristic cannot receive any damping liquid flow.

As indicated by the dashed and solid lines and arrows, when the control valve 6 is closed, damping liquid may only flow through the second damping valve 8 having the hard damping characteristic. In FIG. 2, the dashed lines indicate the flow paths defined by the flow of the damping liquid when the housing 5 moves in the direction of rebound (i.e. in the figures upward). The flow paths represented by solid lines are the flow paths followed by the damping liquid when the housing 5 moves in the direction of compression (i.e. in the figures downward). Only when the housing 5 moves in the direction of compression, in addition to the second damping valve 8, the check valve 10 provided on element 9 may also receive a flow.

When the housing represented in FIG. 2 moves in the direction of rebound (i.e. in FIG. 2 upward), then the main part of the damping liquid (indicated by the thicker dashed line) flows through the passive pressure relief valve 30 on the second damping valve. A smaller fraction of the damping liquid flows parallel thereto through a permanent bypass 31 in the second damping valve 8. Thus, when the control valve 6 is closed and the housing 5 moves in the direction of rebound, the damping force of the shock absorber is thus determined by the pressure relief valve 30 and the permanent bypass 31 of the second damping valve 8.

When the housing 5 moves in the direction of compression (i.e. in FIG. 2 downward), the damping liquid flows through the pressure relief valve 33 effective in the direction of compression (indicated by the thicker solid line) and with a smaller fraction through the permanent bypass 31. In addition, in this moving direction of the housing 5 in the direction of compression, another bypass passage 35 is available for the damping liquid that is formed by the check valve 10 on the element 9. Thus, when the housing 5 moves in the direction of compression, the damping liquid volume flow is not only divided into two but a total of three flow paths. Thus in the compression stage, a different damping force gradient is achieved than in the rebound stage. The approach of the check valve 10 takes place via the center passages 20 provided in the second damping valve 8 and element 9.

Openings 40 are distributed angularly around the periphery of the housing 5 through which the damping liquid may flow into the housing 5 (rebound stage) or out of the housing (rebound/compression stage).

Figure 3:
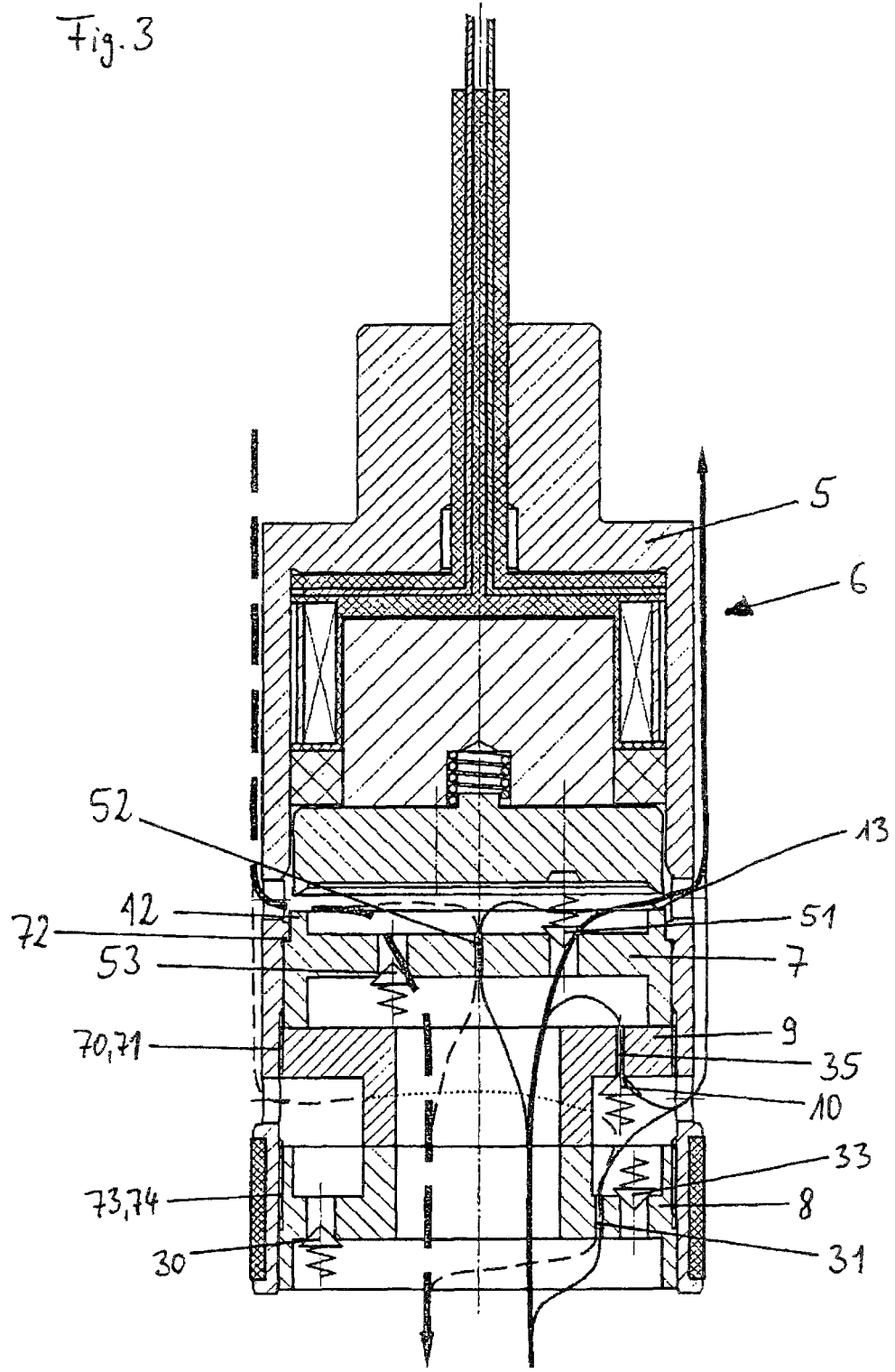
FIG. 3 shows the inventive valve arrangement according to FIG. 1 in a second operating state.

In FIG. 3, a second operating state of the shock absorber according to the invention is represented. This operating state is characterized by an open control valve 6 and low piston rod speeds. This means that the damping liquid flows represented by dashed and solid lines in FIG. 3 only occur at relatively low moving speeds of the housing 5.

In line with FIG. 2, the flow paths of the damping liquid when the housing 5 moves in the direction of compression (i.e. in FIG. 3 upward) are represented by dashed lines. The solid lines indicate the flow paths of the damping liquid when the housing 5 moves in the direction of compression (i.e. in FIG. 3 downward).

If the housing 5 moves in the direction of rebound and the control valve 6 is open, as represented in FIG. 3, then a main part of the damping liquid flows through the pressure relief valve 53 of the first damping valve 7. A smaller fraction of the damping liquid flows through the permanently open bypass opening 52 also provided in the first damping valve 7. A third fraction of the damping liquid volume flow flows through the permanently open bypass passage 31 in the second damping valve 8. Thus, the damping liquid volume flow splits into three partial flows.

The second damping valve 8 having the hard damping characteristic stays closed, because at low piston rod speeds, the opening pressure of the pressure relief valve 30 is not exceeded.

However, when the housing 5 moves in the direction of compression, the damping liquid volume flow splits into a total of four partial volume flows. The largest partial volume flow flows through the pressure relief valve 51 on the first damping valve 7. A smaller partial volume flow flows through the permanently open bypass passage 52 of the first damping valve 7. Another partial volume flow flows through the permanently open bypass passage 31 in the second damping valve 8. A fourth partial volume flow flows through the check valve 10 on the element 9 that only opens when the housing 5 moves in the direction of compression. Thus, when the housing 5 moves in the direction of compression, due to the additional bypass passage in element 9, a larger flow area is available for the damping liquid than when the housing 5 moves in the direction of rebound. Consequently, for the compression stage of the shock absorber according to the invention a different gradient of the damping characteristic curve can be achieved than for the rebound stage. Specifically, in the compression stage, a lower damping force is obtained than at the same housing speed in the rebound stage.

In the operating state represented in FIG. 3, it is also applicable for the compression stage that the second damping valve 8 having the hard damping characteristic stays closed due to low piston rod speeds, so that only the first damping valve 7 having the soft damping characteristic determines the damping characteristic together with the bypass passages described above.

Figure 4:
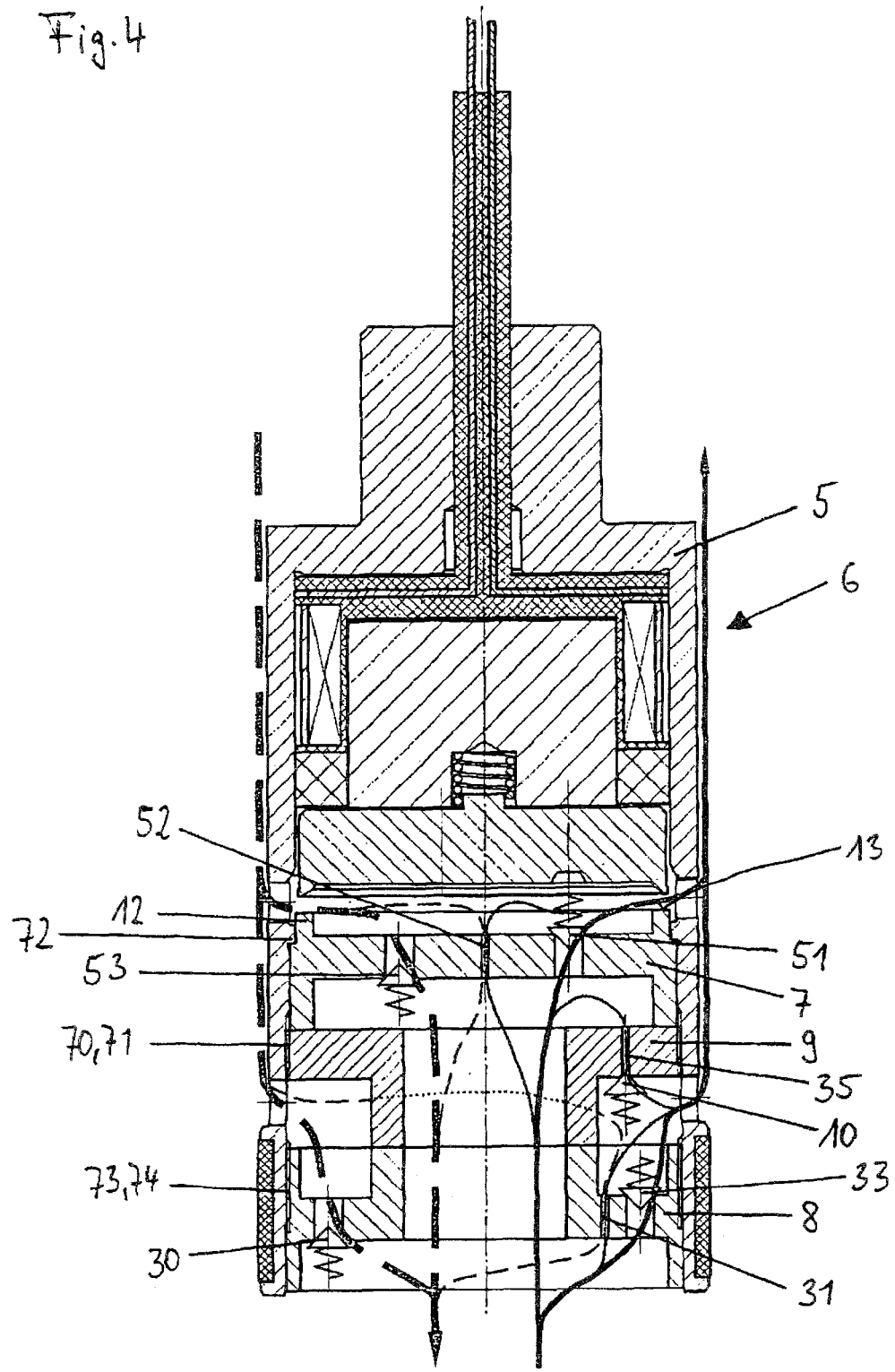
FIG. 4 shows the inventive valve arrangement according to FIG. 1 in a third operating state.

In FIG. 4, a third operating state of the shock absorber according to the invention is represented. Just as in the second operating state represented in FIG. 3, the control valve 6 is open. However, in contrast to the second operating state, the third operating state represented in FIG. 4 shows the flow conditions that occur at relatively high piston rod speeds.

Again, the dashed lines indicate the flow conditions when the housing 5 moves in the direction of rebound, i.e. in FIG. 4 upward.

It is clearly apparent that the damping valves 7 and 8 are provided hydraulically parallel to each other.

In the third operating state according to FIG. 4, when the housing 5 moves in the direction of compression, the damping liquid volume flow splits into a total of four partial volume flows. A first partial volume flow flows through the pressure relief valve 53 which is made on the first damping valve 7 having the soft damping characteristic. A second larger partial volume flow flows through the pressure relief valve 30 on the second damping valve 8 having the hard damping characteristic. Indeed, due to high piston rod speed, the opening pressure of the pressure relief valve 30 is exceeded, so that in comparison with the second operating state according to FIG. 3, this additional partial volume flow through the second damping valve 8 occurs. The remaining two smaller partial volume flows correspond to the partial volume flows through the bypass passages 31 and 52 already described with regard to the second operating state according to FIG. 3.

When the housing 5 moves in the direction of compression, i.e. in FIG. 4 downward, then the damping liquid volume flow splits into a total of five different partial volume flows. A first partial volume flow flows through the pressure relief valve 51 which is provided at the first damping valve 7. A second larger partial volume flow flows through the pressure relief valve 33 which is provided at the second damping valve 8 because due to the greater piston rod speeds present in the third operating state according to FIG. 4, the opening pressure of the pressure relief valve 33 is exceeded. The remaining three smaller partial volume flows correspond to the partial volume flows already been described above with regard to second operating state according to FIG. 3 (bypass passages 31, 35, 52).

Thus, it should be noted that even in third operating state for a moving direction of the housing 5 in the direction of compression, due to the check valve 10 provided in element 9, a larger flow area is available for the damping liquid than when the housing 5 moves in the direction of rebound. Consequently, again in the compression stage, a different damping force gradient is achieved than in the rebound stage.

Figure 5:
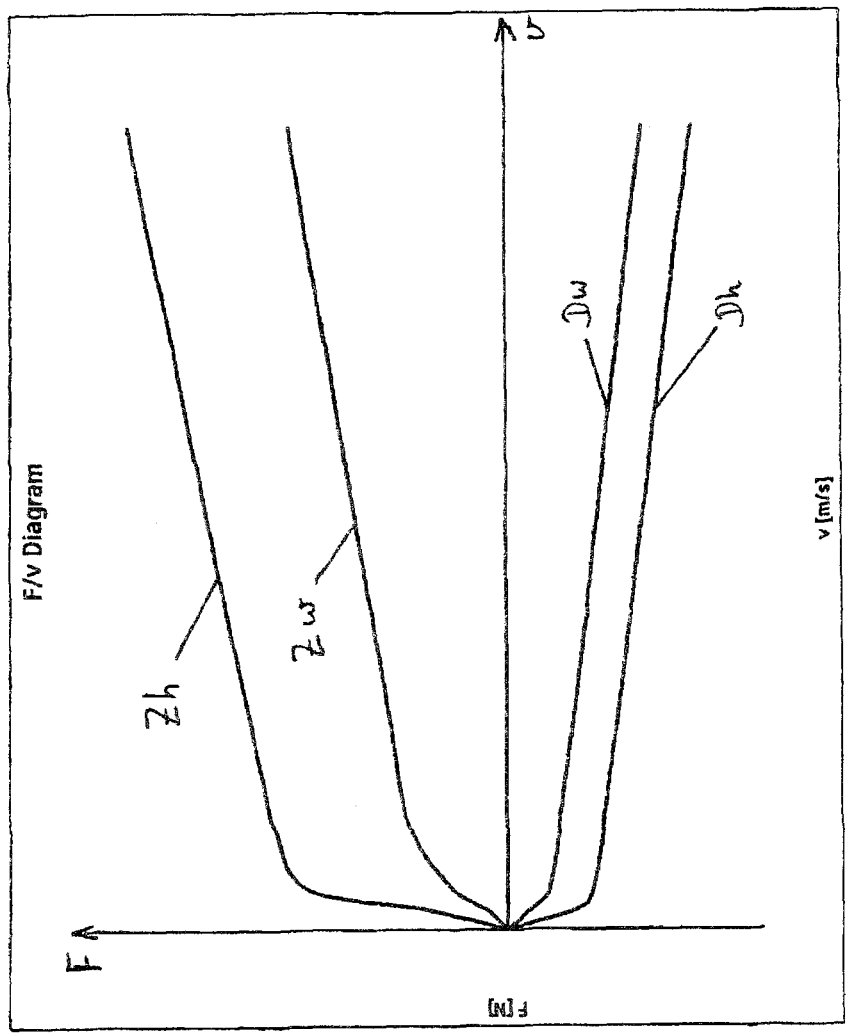
FIG. 5 shows a damping force/speed diagram with damping characteristic curves for the rebound and compression stages of a shock absorber made according to FIGS. 1 to 4.

In FIG. 5, as an example, four different damping characteristic curves are represented in a damping force/piston rod speed diagram (F/v diagram) that are adjustable by a shock absorber made according to FIGS. 1 to 4. Reference symbol Zh designates the characteristic curve describing the hard damping characteristic in the rebound stage. Reference symbol Dh designates the characteristic curve describing the hard damping characteristic in the compression stage. Zw or Dw designates the soft damping characteristic in the rebound stage or compression stage. It is clearly apparent that even at high piston rod speeds, a soft damping characteristic ensuring good driving comfort is still achieved. Also, the gradient of the characteristic curve according to FIG. 5 has a desired significant spread between the hard and soft damping characteristics. The invention has the advantage that the gradients of the characteristic curves can be easily adapted to customer wishes, e.g. by adapting the diameter of the bypass passages 31, 35, and 52. Thus, even small shock absorbers with small damper tube diameters can be designed flexibly with variable damping characteristics.

Figure 6:
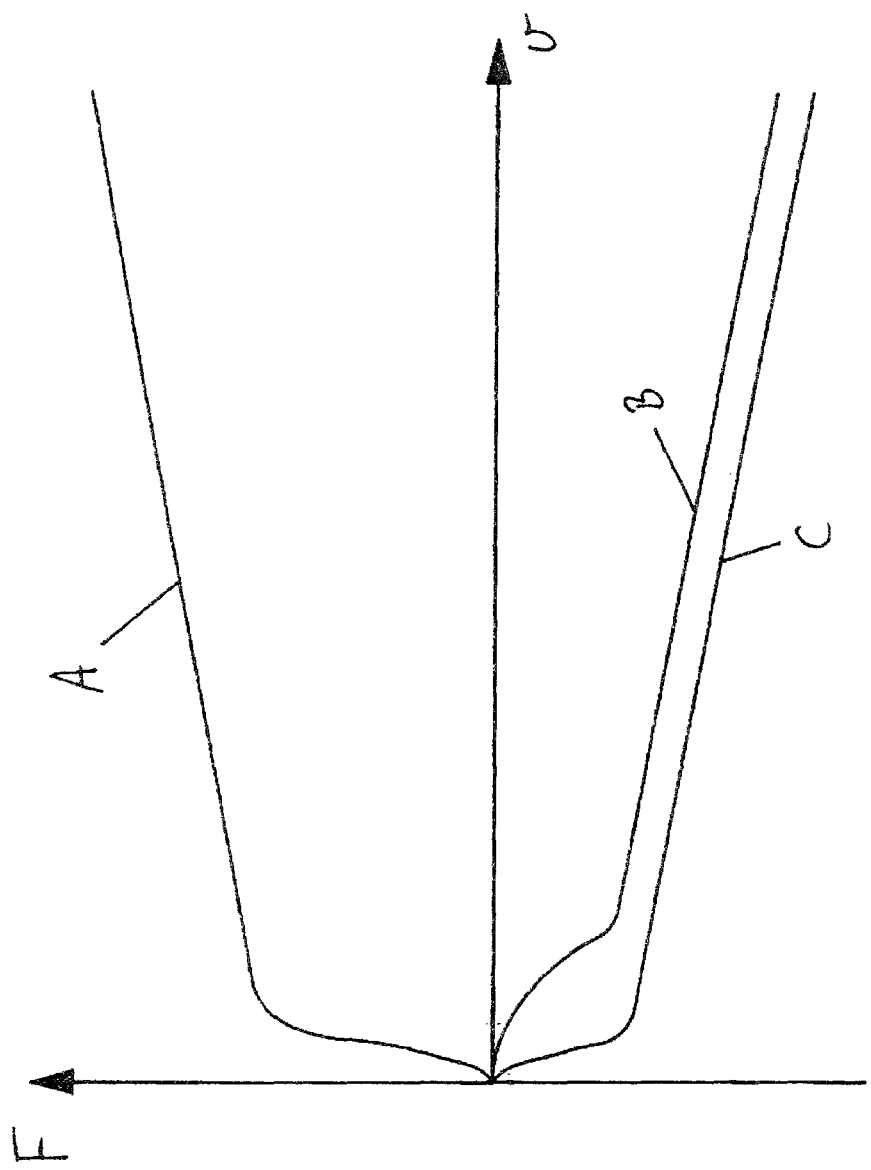
FIG. 6 shows a damping force/speed diagram with damping characteristic curves for the rebound and compression stages to explain the impact of the element having a check valve on the damping characteristic curves.

FIG. 6 shows in an F/v diagram the influence of element 9 with check valve 10 according to FIGS. 1 to 4 on the damping characteristic curves for the rebound stage and the compression stage. The damping force characteristic curve for the rebound stage is described by characteristic curve A. The damping characteristic curve for the compression stage of the shock absorber according to the invention is described by characteristic curve B. It is clearly apparent that in the range of lower piston rod speeds, the compression stage characteristic curve has a completely different (lower) slope and a completely different gradient than the rebound stage characteristic curve A. This corresponds to an asymmetric characteristic curve arrangement frequently desired by vehicle manufacturers in the rebound stage and in the compression stage.

The damping characteristic curve designated by the letter C is a damping force characteristic curve which would occur if element 9 had no check valve and thus no additional bypass cross-section 35 effective in the compression stage were available. It is clearly apparent that in this case, in the range of low piston rod speeds, the slope of the damping force characteristic curve C is the same as for the rebound stage characteristic curve A.

A comparison of both gradients of characteristic curves B and C shows that by providing the additional bypass cross-section 35 by the check valve 10 on element 9, lower damping forces are achieved at defined piston rod speeds than if element 9 had no check valve.

FIG. 6 very clearly shows how the additional check valve 10, through which a flow may pass and which is made on element 9, very well allows in a simple and cost-effective manner for a different damping characteristic to be achieved in the rebound stage and the compression stage. Thus, the inventive valve arrangement allows for the shock absorber to be very well adapted to different customer demands.

In the damping valve arrangement according to the invention, several different provisions minimize the axial space necessary for the valve arrangement.

On the one hand, the axial space of the valve arrangement according to the invention is minimized in that the damping valve 8 having the hard damping characteristic has been integrated into the interior of the housing 5, while the housing 5 has been designed in terms of diameter thereof so that the piston ring 14 provided on the housing 5 subdivides the damper tube interior into a piston rod-side working chamber 3 and a working chamber 4 remote from the piston rod. Thereby, in particular with McPherson strut units, the required force transmission, from the piston rod 2 to the damper tube 1 can take place via the housing 5. In conventional shock absorbers, this function is usually performed by the working piston which for this purpose must not fall short of a defined minimum overall height. In conventional shock absorbers, the working piston then usually also has the hard damping characteristic. Thus, in conventional shock absorbers, the overall axial height of the damping element responsible for the hard damping characteristic (namely the working piston) must not be reduced below a defined dimension. In the valve arrangement according to the invention, however, the second damping valve 8 responsible for the hard damping characteristic can be minimized with respect to the overall axial height thereof, because it is not necessary for it to be available for force transmission from the piston rod to the damper tube. As explained, this force transmission is performed exclusively via the housing 5.

On the other hand, axial space in the valve arrangement according to the invention was saved in that the valve face 13, on which the valve body 11 is sealingly seated in the closed state, is not formed by a separate component, but is integrated into the first damping valve 7. For this purpose, the first damping valve 7 has a peripheral rim 12 forming the front face of the valve face 13 for the valve body 11. Thus, no separate component connected to the housing 5 or radial ridge of the housing 5 is required to provide a valve face for the valve body 11. This again saves axial space. In particular, in comparison with the solution mentioned at the beginning according to DE 35 18 327 A1, significant axial space saving is obtained because the component having an H-shaped cross-section, known from DE 35 18 327 A1, requires considerable axial space. The inventive valve arrangement, however, is axially very compact.

In the valve arrangement according to the invention, element 9 is integral with the housing 5. Thus, the first damping valve 7 is solidly clamped between the element 9 and a radial ridge 72 of the housing 5.

Due to the damping element according to the invention, a conventional shock absorber having a conventional damping piston fastened to the piston rod can be easily converted into a shock absorber that can be switched back and forth between two different damping characteristics (hard damping/soft damping). All that is required for this purpose is for the conventional damping piston to be removed from the piston rod and the housing 5 of the valve arrangement according to the invention to be fastened to the piston rod. The required power supply for operating the electromagnetic control valve 6 is done using a hollow piston rod, through the empty center of which the required cables are guided.

The valve arrangement according to the invention allows for the housing 5 to be made with a maximized inner diameter with respect to the damper tube inner diameter, so that the damping valves 7 and 8 can have a maximum diameter. This is important in particular for designing the first damping valve 7 having the soft damping characteristic. In order to achieve a damping effect which will increase driving comfort at all piston rod speeds and maximize the spread between the hard and soft damping characteristics, in particular with shock absorbers having small damper tube diameters, a maximum diameter for the damping valve with the soft damping characteristic must be provided. In the valve arrangement according to the invention, this is achieved in an exemplary manner.

The invention claimed is:

1. A shock absorber for a wheel suspension of a motor vehicle, the shock absorber comprising:
    a damper tube at least partially filled with damping liquid and extending along an axis,
    a piston rod axially shiftable inside the damper tube,
    a piston housing connected to the piston rod and subdividing an interior of the damper tube into a piston rod-side working chamber and a working chamber remote from the piston rod,
    an on-off control valve axially movable inside the piston housing between a closed and an open position, the piston rod-side working chamber and the working chamber remote from the piston rod being hydraulically interconnected via the piston housing,
    a first damping valve inside the piston housing, having a soft damping characteristic, through which the damping liquid may flow in both flow directions, and connectable to a flow path of the damping liquid from one into the other working chamber through the control valve, and
    a second damping valve connected hydraulically in parallel to the first damping valve, having a hard damping characteristic, through which the damping liquid may flow in both flow directions, and in the interior of the piston housing.

2. The shock absorber according to claim 1, wherein the control valve is an electromagnetic or piezoelectric control valve having an axially movable a valve body, the first damping valve having a peripheral edge forming a valve face for the valve body.

3. The shock absorber according to claim 1, further comprising:
    an element between the first damping valve and the second damping valve and provided with at least one check valve.

4. The shock absorber according to claim 3, wherein the element between the damping valves has one check valve through which the damping liquid may flow only when the piston rod moves in one direction.

5. The shock absorber according to claim 3, wherein the element has two check valves, through one of which the damping liquid may flow in the one direction when the piston rod moves in the one direction, and through the other one of which the damping liquid may flow in an opposite direction when the piston rod moves in the opposite direction, the check valves cooperating with bypass channels of different flow sections.

6. The shock absorber according to claim 2, the element is between the first and the second damping valve and is provided with at least one check valve.

7. A valve arrangement for fastening to a piston rod of an axially effective shock absorber for a wheel suspension of a motor vehicle, comprising:
    a piston housing connectable to the piston rod,
    an on-off control valve axially shiftable inside the piston housing between a closed and an open position, the piston housing subdividing an interior of the piston housing into a piston rod-side working chamber and a working chamber remote from the piston rod of the shock absorber, the chambers being hydraulically interconnected via the piston housing, and
    a first damping valve in the piston housing, having a soft damping characteristic through which the damping liquid may flow in both flow directions, connectable to a flow path of the damping liquid from one to the other working chamber through the control valve, and
    a second damping valve connected hydraulically in parallel to the first damping valve, having a hard damping characteristic, through which the damping liquid may flow in both flow directions.

8. The valve arrangement according to claim 7, wherein the control valve is embodied as an electromagnetic or piezoelectric control valve activating a valve body, the first damping valve having a peripheral edge forming a valve face for the valve body.

9. The valve arrangement according to claim 8, wherein the element is between the first and the second damping valve and has at least one check valve is arranged.

10. The valve arrangement according to claim 7, an element is between the first and the second damping valve and has at least one check valve.

11. The valve arrangement according to claim 10, wherein the element has one check valve through which the damping liquid may flow only when the piston rod moves in one direction.

12. The valve arrangement according to claim 10, wherein the element has two check valves, through one of which the damping liquid may flow in the one direction when the piston rod moves in the one direction, and through the other one of which the damping liquid may flow in an opposite direction when the piston rod moves in the opposite direction, the check valves cooperating with bypass channels of different flow sections.

* * * * *